United States Patent [19]

Ajewole

[11] Patent Number: 5,666,150
[45] Date of Patent: Sep. 9, 1997

[54] NON-UNIFORMITY CORRECTION FOR LED PRINTHEAD IN ELECTROPHOTOGRAPHIC GRAY SCALE PRINTING

[75] Inventor: Isaac L Ajewole, Greece, N.Y.

[73] Assignee: Eastman Kodak Company, Rochester, N.Y.

[21] Appl. No.: 175,079

[22] Filed: Dec. 29, 1993

[51] Int. Cl.$^6$ ............................... B41J 2/47; B41J 2/435
[52] U.S. Cl. ............................................. 347/240; 347/237
[58] Field of Search ................................. 347/240, 237, 347/199, 236, 133, 191, 183, 184, 131; 346/160

[56] References Cited

U.S. PATENT DOCUMENTS

| | | | |
|---|---|---|---|
| 4,653,013 | 3/1987 | Collins et al. | 347/900 |
| 4,831,395 | 5/1989 | Pham et al. | |
| 4,857,944 | 8/1989 | Hart et al. | |
| 4,885,597 | 12/1989 | Tschang et al. | |
| 4,982,203 | 1/1991 | Uebbing et al. | |
| 5,016,027 | 5/1991 | Uebbing | 347/237 |
| 5,025,322 | 6/1991 | Ng | 347/237 |
| 5,200,765 | 4/1993 | Tai | |

FOREIGN PATENT DOCUMENTS

WO91/10311  7/1991  WIPO.

*Primary Examiner*—Benjamin R. Fuller
*Assistant Examiner*—Thinh Nguyen

[57] ABSTRACT

A method and apparatus for calibrating a gray level recording printhead having a plurality of light-emitting recording elements is described. In the calibrating method a light intensity of each recording element is measured. The light intensities measured are quantized into M first cells. For each cell an exposure time t (i, j) is determined wherein i is a number representing number of cells and varies from i=1, . . . M and j is a number greater than one representing a number of gray levels. The set of exposure times {t (i, j)} is sorted to remove duplicate times and define a subset of exposure times {t (k)}. A non-uniformity constant value u is associated with each exposure time t (k). Boundaries for plural second cells are defined wherein exposure times, t (k), within a cell are spaced within substantially about the value u from a time b (n) that is calculated from a cell boundary and also falls within the boundaries of each cell. If a number of calculated times b (n) is such that n is different from N, a number representing a number of available exposure times of the printhead, certain of the steps above are repeated with replaced values u until n=N and there is then stored a set of values representing b (n) in a memory associated with the printhead.

6 Claims, 13 Drawing Sheets

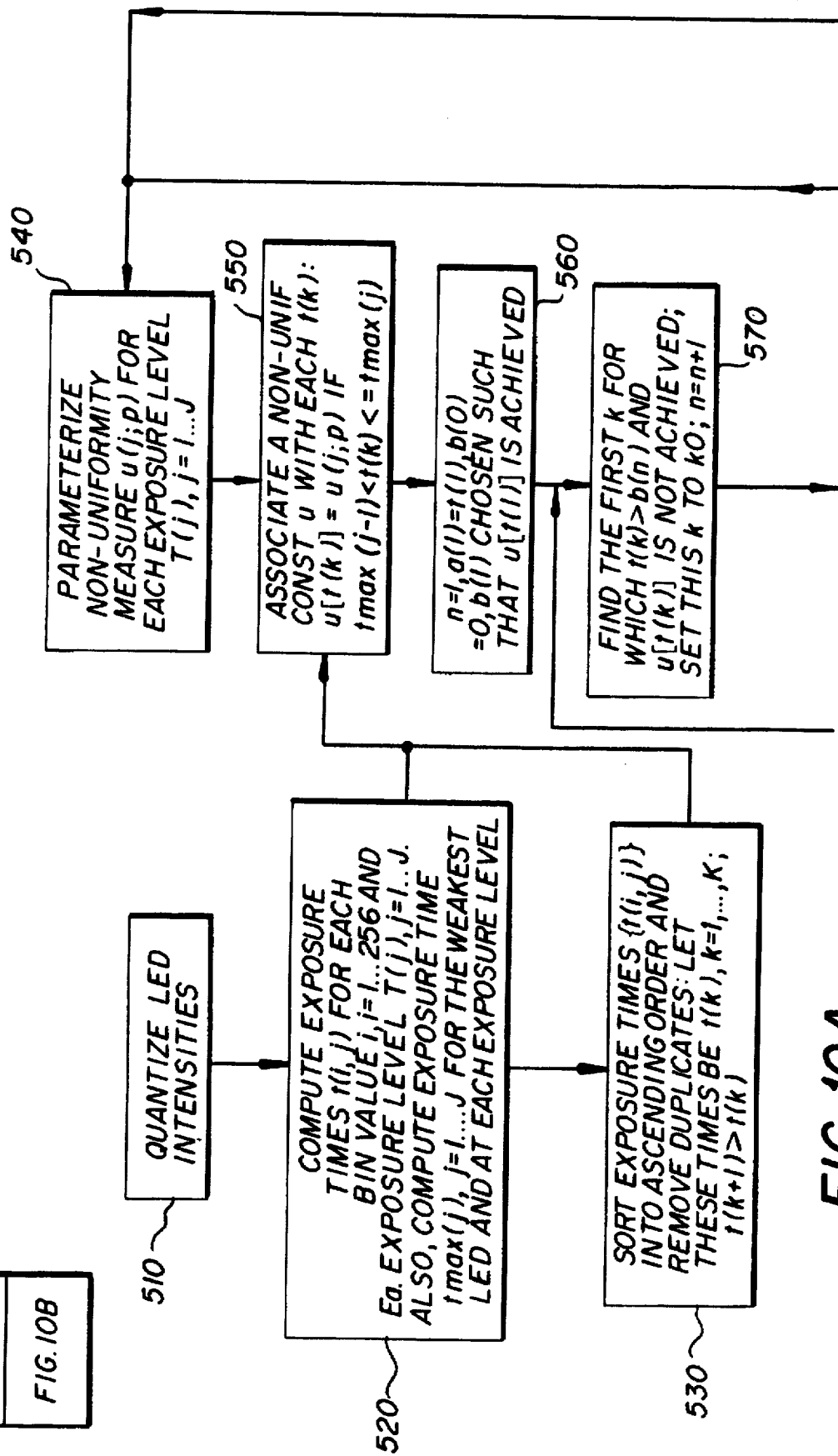

NON-UNIFORMITY CORRECTION FOR LED PRINTHEAD IN ELECTROPHOTOGRAPHIC GRAY SCALE PRINTING

BACKGROUND OF THE INVENTION

1. Field of the Invention

The present invention relates to LED writers and more particularly to method for correcting for non-uniformities associated with such writers.

2. Description Relative to the Prior Art

With reference to PCT publication No. WO 91/10311, the pertinent contents of which are incorporated herein by reference, in an LED-based gray scale electrophotographic printing system, exposure is usually controlled by the length of time each LED is turned on with the emitted light intensity held constant. The LED on-time varies imagewise and the resulting exposure is given by the product of this time and the intensity. The printhead itself is comprised of several thousand individual LEDs and, because of variation in LED response, the light intensity varies from LED to LED within the same printhead for the same amount of energizing current. This results in a non-uniform exposure of an otherwise uniform field.

For each level of gray the number of exposure times that can be requested is potentially equal to the number of LEDs in the printhead. Thus, for a j-bit gray level system that uses an LED printhead with N LEDs as the writer, the number of possible exposures that can be requested is $N (2^j-1)$, excluding the null exposure level (white). For N=4000 (typical) and j=2, this number is 12,000. There is no economical printhead architecture that is capable of generating nearly as many exposures as this. The number of exposures that a typical LED printhead can generate is determined by its controller circuit. For a printhead with a k-bit controller, the total number of exposures that can be generated is $2^k$, with $j \leq k$ but significantly less than $N (2^j-1)$. It is the goal of a non-uniformity correction algorithm to use the total number of exposures that can be requested to generate an optimum look-up table (LUT) with $2^k$ entries. The procedure for generating the LUT must condense in some optimal manner all the exposures that can be requested (including zero) into $2^k$ exposures.

The actual number of exposures that can be requested depends on the distribution of the LED intensifies and the range and distribution of the $(2^j-1)$ gray levels. This number is usually less than the number quoted above because some of the exposures coincide.

In FIG. 1, there is shown the distribution of LED intensities for a k=6-bits per pixel controller printhead. This printhead has 4608 LEDs of which several (at the extreme ends) are dead. If this printhead is used to print 4-bit gray levels, the total number of distinct exposures must be available for perfect uniformity is somewhat less than 2000, depending on the 15 gray levels selected. This number of available exposures while quite large is still smaller than it could otherwise be because of overlap in the gray levels. For the 15 gray levels shown in Table 1 below, the distribution of exposure times is shown in FIG. 2. FIGS. 3a and 3b show the kind of uniformity (as print and power spectrum, respectively) obtained from the uncorrected exposures. Note in all the uniformity prints in this invention, only the last 10 steps are shown. The remaining 5 steps are too light to be reproduced faithfully. The power spectrum plots are for the eighth of the fifteen steps; i.e., the third lightest of those shown here.) The huge spike in FIG. 3b is due to the imbedded non-uniformity of the Selfoc lenses covering the LEDs. The print in FIG. 3a and the plot in FIG. 3b clearly demonstrates the need to correct the non-uniformity so that each gray level or step of a flat field is rendered as a uniform field.

TABLE 1

| Step # | Exposure Time (microseconds) |
|---|---|
| 1 | 4.70 |
| 2 | 11.01 |
| 3 | 12.74 |
| 4 | 14.27 |
| 5 | 15.76 |
| 6 | 17.02 |
| 7 | 18.42 |
| 8 | 20.10 |
| 9 | 21.84 |
| 10 | 23.76 |
| 11 | 25.90 |
| 12 | 28.51 |
| 13 | 31.59 |
| 14 | 35.52 |
| 15 | 44.68 |

Current methods of correcting this non-uniformity fall into two broad categories (1) linear quantization of the minimum-maximum range of exposures that can be requested into the number of available exposures; i.e., $2^k$ levels and (2) nonlinear quantization of same range into same number of levels. These two methods have been described and practiced in U.S. Pat. No. 4,982,203 to set the initial corrected exposure for each LED to achieve uniformity. These settings are subsequently adjusted to compensate for the effects of aging and thermal heating of the LEDs. Another type of nonlinear quantization is employed in U.S. Pat. No. 4,857,944, both for the initial calibration and subsequent recalibrations. The main drawbacks of this kind of nonlinear quantization are 1) it addresses only the binary. (i.e. j=1) case and 2) it is not easy to implement.

Another kind of nonlinear quantization method is that described in U.S. Pat. No. 5,200,765. In this method, the total number of available printhead levels $(2^k-1)$ is divided nonlinearly among the $2^j-1$ input gray levels (white excluded). The exposure range for each gray step is then quantized linearly into the number of levels assigned to it. The more levels a gray step receives, the more uniform that level is rendered. More levels are assigned to the light areas than to the darker ones because the eye is most sensitive to noise in the low density region. If the levels are assigned properly, this method can result in very good uniformity across the density spectrum. The main drawbacks of this technique are 1) the correct level assignment to achieve a particular uniformity is done on a trial and error basis, thereby requiring the running of the algorithm several times and user intervention each time to enter the levels, 2) the algorithm is not as robust as the method of my invention with respect to the gray levels selected and the LED intensity distribution, and 3) the procedure may not be optimal because of the linear quantization used for each gray level.

There is presently a need for an easy-to-implement-and-use process that corrects for the inherent non-uniformity of LED printhead. The needed algorithm must be optimally robust with respect to the selected gray levels and LED intensity distribution and must be capable of achieving specified or target uniformities for any gray level or group of gray levels.

SUMMARY OF THE INVENTION

An object of the present invention is to provide a robust and an easy-to-implement-and-use method of correcting the inherent non-uniformity in an array of LEDs comprising an LED printhead. This method must correct non-uniformity for j bits of gray (j≧1) and must generate an optimal set of m bits of exposure times (m being determined by the controller circuit of the printhead) and an array of exposure coefficients for each gray level.

DETAILED DESCRIPTION OF THE PREFERRED EMBODIMENTS

Because apparatus of the type described herein are well known, the present description will be directed in particular to elements forming part of, or cooperating more directly with, the present invention.

Figure 5:
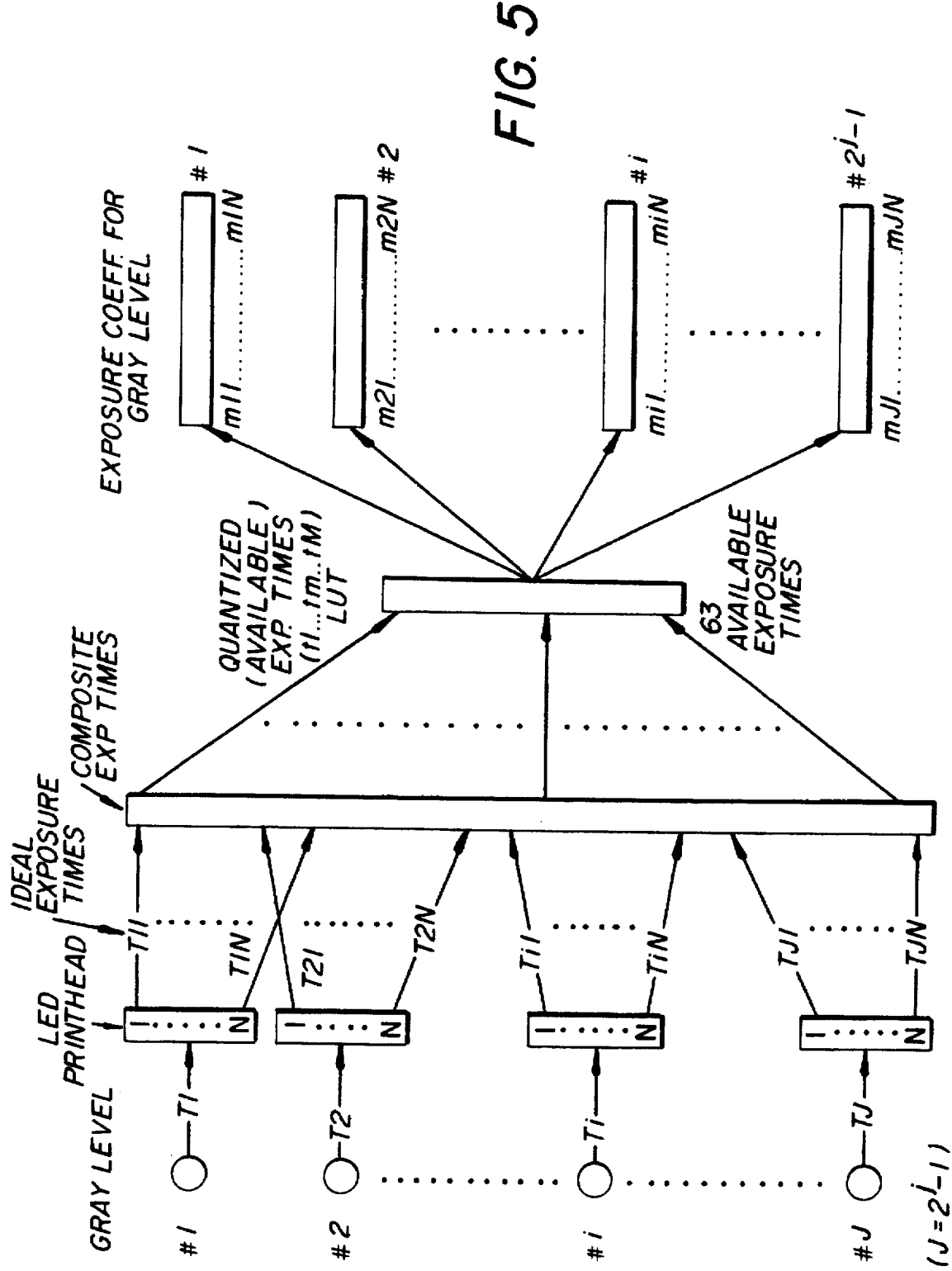
FIG. 5 is an additional illustration supporting the explanation of my calibration method for creation of an exposure coefficients look-up table.
Figure 6:
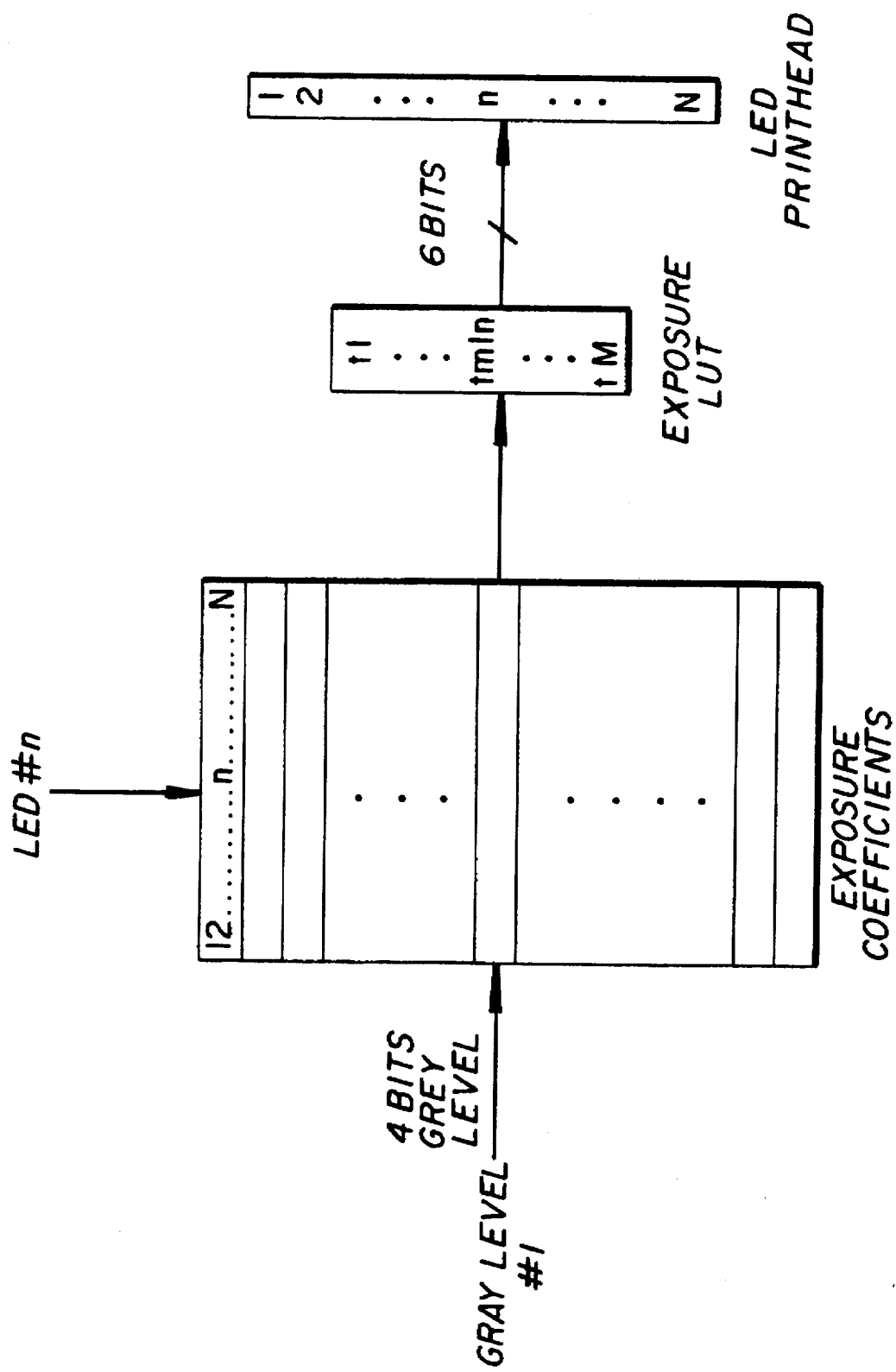
FIG. 6 is a schematic of the table of FIG. 5 illustrating schematically a typical use in an LED printhead.

With reference to FIG. 5, there is shown in schematic form that for J gray levels (for a 4-bits per pixel uncorrected gray level system J=15) there are J exposure set points T1 through TJ. Now for an LED printhead having N non-uniform emitting LEDs arranged in a row and considering gray level #1, having exposure set point T1, there are N ideal exposure times T11 through T1N required to have all the LEDs print an equivalent pixel of gray level #1. Similarly, gray level #2 has exposure set point T2 and requires a range of ideal exposure times T21 through T2N to print pixels of gray level #2. Note that some of the ideal exposure times for gray level #2 overlap those of gray level #1. In eliminating the overlapped times, there is still a range of possibly several thousand ideal composite exposure times required for several thousand LEDs to print uniformity over a gray scale range of say gray level #1 to gray level #15. It is the object of a calibration system to reduce this number of exposure times significantly say in a 6-bits per pixel corrected exposure system to 63 exposures or generally t1 ... tm ... tM in FIG. 5. When these 63 exposure times are ascertained, exposure coefficients may be developed, generally mi1 ... miN for gray level i, so that in the printer an uncorrected gray level signal of j bits per pixel may be modified by an appropriate coefficient as one of those assigned for a particular LED to print the pixel so that the exposure is within a desired uniformity range from the target level for that gray level. In FIG. 6, there is shown an example of use of the exposure coefficeints look-up table prepared in FIG. 5 in an LED printhead. Briefly, a 4-bits per pixel uncorrected gray level signal in conjunction with a count identifying a particular LED, LED n, addresses the coefficients table and an output from this table serves as an address input to a second table that stores M corrected exposure times. Where M=63 corrected exposure times are stored a 6-bits per pixel corrected exposure time signal is fed to the printhead for printing by LED n. An improved calibration method of the invention for obtaining the corrected exposure times will now be described.

As pointed out above, it is necessary to condense the total number of exposures that can be requested into a much smaller number of available exposures and this must be done optimally in order to achieve an acceptable level of uniformity for each level of gray.

Let us assume that a printhead consisting of N LEDs and with a k-bits per pixel controller is to be used to print j bits of gray (j<=k). Note as used herein, (j<=k) implies the same as (j≦k) and is read j is less than or equal to k. Similar useage is made of the greater than or equal symbol. We will use $T_i$, (i=1, ... ,$2^j$−1) to denote the exposure times for each level of gray; $T_i$ (n) the corrected exposure time for LED #n (n=1, ... ,N) and $I_n$, the emitted light intensity for LED #n (n=1, ... ,N).

If each LED was turned on for the same length of time $T_i$ for gray level i, say), the resulting average exposure energy E is given by $$E_{av}(i) = I_{av}T_i \qquad \text{(Eqn. 1)}$$

where $I_{av}$ is the average LED intensity. Each $E_{av}(i)$ is the uniform exposure energy to be targeted for each level of gray. For each LED to produce the target exposure energy $E_{av}^{(i)}$, its exposure time $T_i^{(n)}$ must be chosen such that $$E_{av}(i) = I_n T_i(n) \qquad \text{(Eqn. 2)}$$

i.e. $T_i(n) = E_{av}(i)/I_n = I_{av}T_i/I_n$, $i = 1, \ldots, 2^j - 1; n = 1, \ldots N$ The set {Ti (n) } represents the set of all the discrete exposures required to produce perfect uniformity in each of the gray levels. Since we are limited to only a few available ($2^k$−1) exposures, perfect uniformity is unattainable and the goal is to reduce the required exposures into the ($2^k$−1) available exposures in such a way that acceptable uniformity will be achieved at each gray level.

Figure 4:
FIG. 4 is an illustration supporting the explanation of my calibration method and directed to the creation of cells to which exposure times are assigned.

For the sake of simplicity, let us assume that the exposure time goes continuously from a minimum of $\tau_{min}$ to a maximum of $\tau_{max}$. Suppose this range is divided into (M−1) cells (M=$2^k$) with boundaries τ1, τ2, ... τM and an exposure value 'm, m=1,2 ... ,M−1 is assigned to each cell as shown in FIG. 4. (See also FIG. 5).

Each exposure time τ from the discrete exposure set {$T_2$.(n)} is assigned a value according to the rule (see also FIGS. 5 and 6).

$\tau \to t_m$, if $\tau_m <= \tau < \tau_{m+1}$. (Eqn. 3)

We now define a measure of non-uniformity u as the ratio of the maximum deviation of true exposure from the target exposure; i.e.

$$u = \max_n(I_{av}T_i - I_n t_m(n)/I_{av}T_i)$$ (Eqn. 4)

for each gray level i and with $t_m$ (n) being the actual assigned exposure time for the nth LED and thus $I_n t_m$ (n) is an actual exposure using the assigned exposure time while $I_{av}T_i$; is a target or set point exposure for that gray level. Note that the maximum is taken over all LEDs and that, in general $t_m$ (n) does not equal $T_i$ (n). By writing $I_n$ as $I_{av}T_i/T_i(n)$ from Equation 2, we can rewrite Equation 4 as $$u = \max_n(|T_i(n) - t_m(n)|/T_i(n))$$

$$u = \max_n(|1 - (t_m(n)/T_i(n))|)$$ (Eqn. 5)

It is obvious that it is the exposures $T_i$ (n) at the extreme ends of the $m^{th}$ cell that constitute the maxima in Equation (5). We can therefore write:

$$u = (t_m - \tau_m)/\tau_m = (\tau_{m+1} - t_m)/\tau_{m+1}$$ (Eqn. 6)

These equations can be written as:

$$t_m = (1+u)\tau_m$$ (Eqn. 7)

$$\tau_{m+1} = t_m/(1-u) = \tau_m(1+u)/(1-u)$$ (Eqn. 8)

Equations 7 and 8 can be used recursively to generate the $t_m$'s and $\tau_m$'s for a given constant non-uniformity parameter u, starting with $\tau_1 = \tau_{min} = I_{av}T_1/I_{max}$. However, in order to satisfy the hardware constraint, we must have $$t_{m+1} - t_m >= \delta, m >= 1$$ (Eqn. 9)

i.e., $\tau_{m+1} - \tau_m >= \delta/(1+u), m >= 1$ $\to t_m >= (\delta/2u)(1-u)/1 + u, m >= 1$ Thus the effect of the hardware constraint is to force a lower bound $u_{min}$ on u, the non-uniformity measure as a function of exposure time. In summary, we need to solve Equations 7 and 8 together with the constraint:

$$\tau_{m+1} - \tau_m >= \delta/(1+u), m >= 1$$ (Eqn. 10)

In the region where Eqn. 10 cannot be satisfied, one forces $\tau_{m+1}$ to be equal to $\tau_{m+1}/(1+u)$ and accepts the resulting non-uniformity imposed by the hardware constraint.

One can always find an M that gives the u that one wants after adjusting the hardware imposed non-uniformity at the low end of the exposure time scale and, of course, M increases as u decreases. However, for a given M, there is an upper bound $u_{max}$ on u.

In Appendix 1, there is shown that $u_{min}$ (discussed earlier) and $u_{max}$ are given by:

$$u_{min} = (\sqrt{4\tau^2 + \delta^2 + 12\delta\tau} - (\delta + 2\tau))/4\tau$$ (Eqn. 11)

$$u_{max} = (\beta - 1)/(\beta + 1)$$ (Eqn. 12)

where $\beta = {}^{(M-1)}\sqrt{(\tau_{max}/\tau_{min})}$

Figures 7, 9:
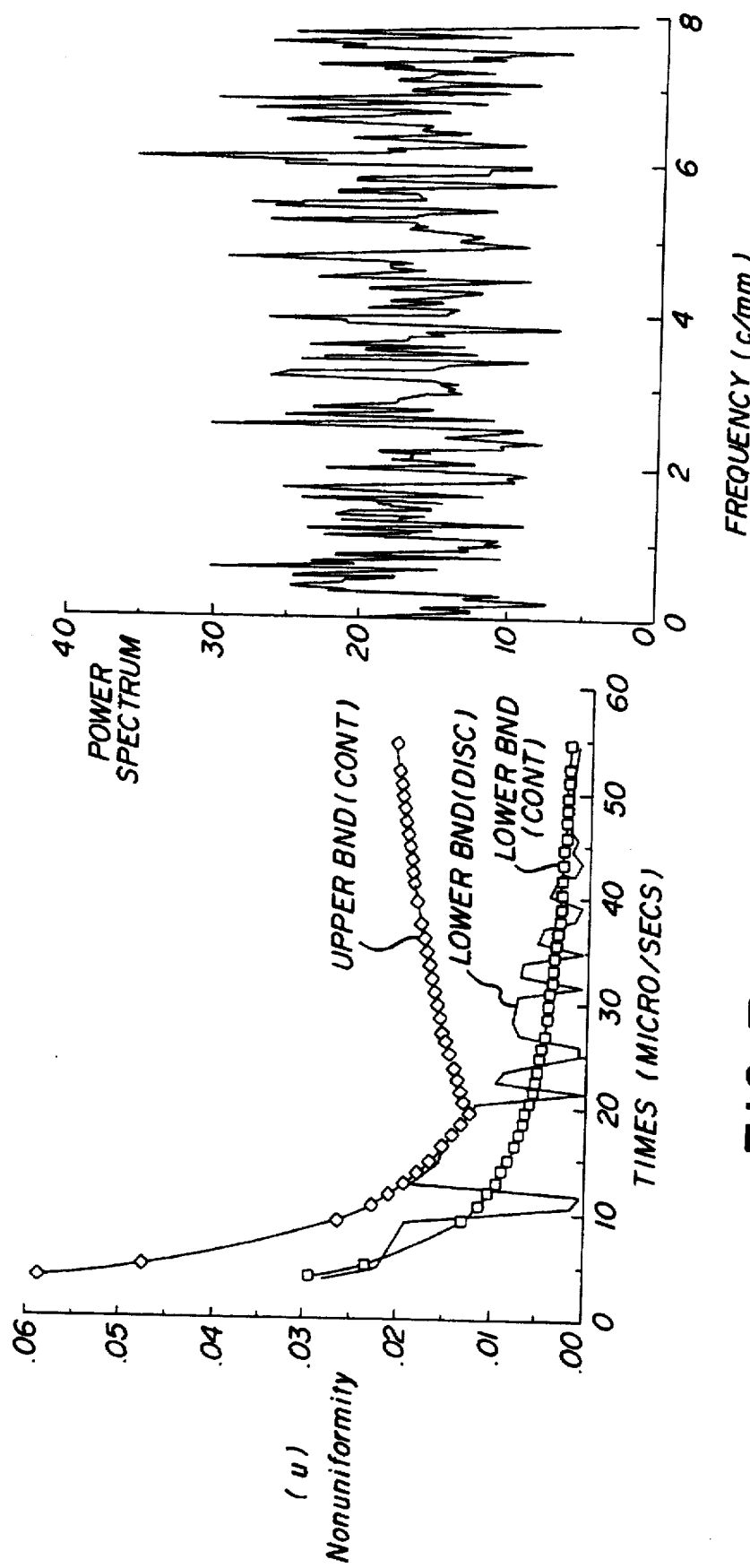
FIG. 7 is an illustration supporting the explanation of my calibration method and illustrates upper and lower bounds for non-uniformity.
FIG. 9 illustrates a power spectrum after correction in accordance with my invention. The scale is significantly different than that of FIG. 3b and shows significant improvement in uniformity.
Figure 8:
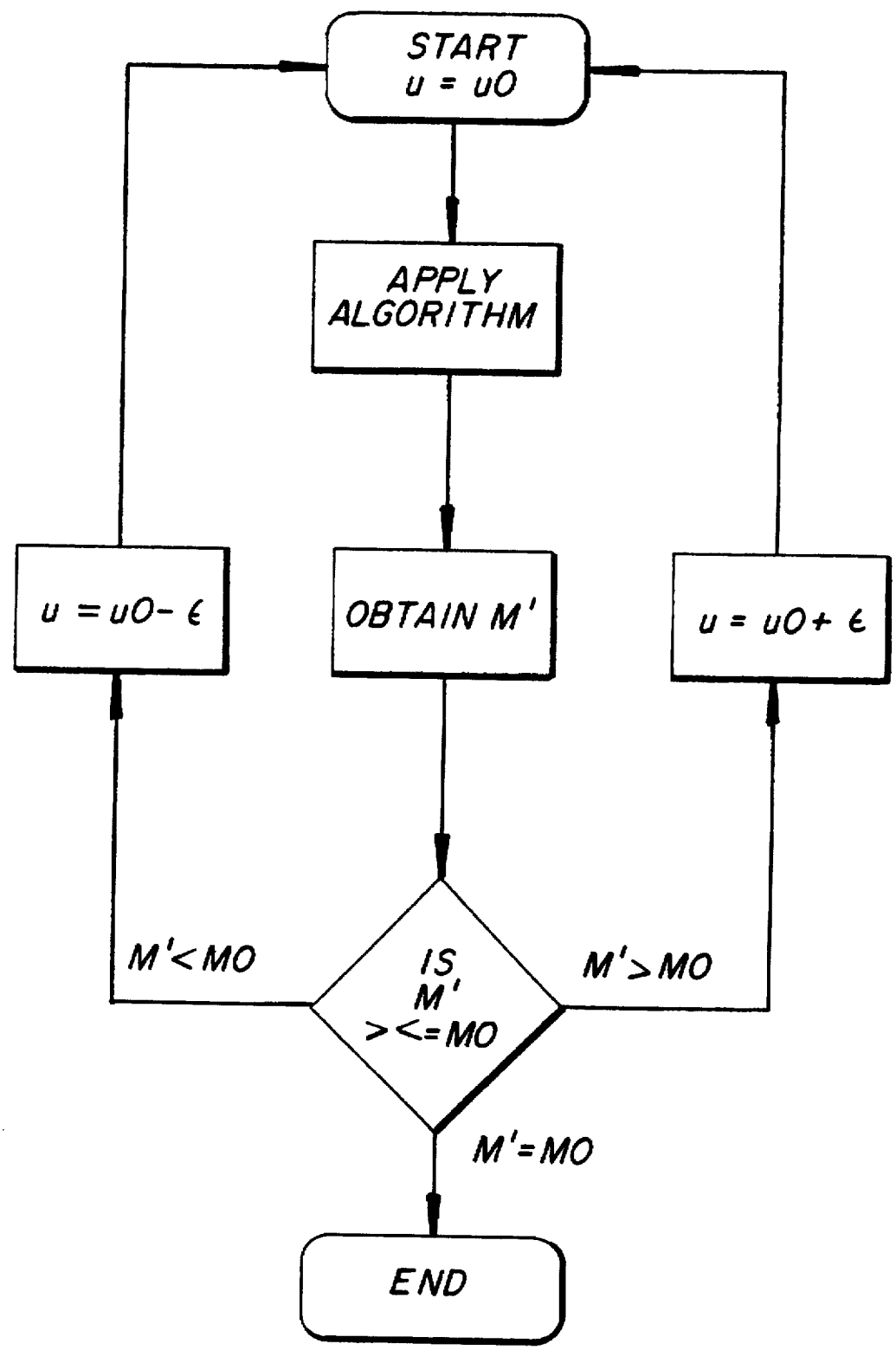
FIG. 8 is one flowchart supporting the explanation of my calibration method.

These bounds are plotted in FIG. 7. The bounds are for the non discrete exposure times but we also include the lower bound for the actual discrete case. The upper bound has been plotted with $\tau_{max}$ as the variable and with M=64. This bound is in two segments: the first segment is for $\tau < 63\delta$; i.e., $\tau_{max}$ is such that all the levels are constrained by the hardware— they are $\delta$ apart; the second is actually Equation 12.

A program or algorithm that will determine the exact u for a given M by repetitive application of Equations 7 and 8 is described below. This value of u, which I will denote by $u_c$, represents the lowest possible for the given M. One starts with any reasonable u (say $u_0$) and finds what value of M (say M') is necessary to give this level of uniformity using the aforementioned algorithm. If M' is less than the given M (say $M_0$), one decreases u and repeats the procedure; if M' is greater than $M_0$, one increases u and repeats the procedure. One continues to do this until M' equals $M_0$. This procedure converges because u is a monotonically decreasing function of M.

The case of varying u can also be solved using equations 7 and 8 with $u = u(\tau_m)$. It is important to note however that each $u(\tau_m)$ can only be attained if it is greater than $u_{min}$ at that exposure time as in equation 11. Also, it may be impossible to obtain the given u across the exposure range for a given M. In this case, one satisfies the requirement for the low end of the exposure scale (light area) as much as possible and pushes the non-uniformity towards the high density region.

An important case of varying u is the case where u increases linearly with lightness from $u_1$ in the lightest region to $u_2$ in the darkest region. The resulting $u(\tau_m)$ which is not linear with respect to $\tau_m$ can be computed from the process curve. A good procedure for choosing $t_m$'s and $\tau_m$'s in order to achieve the optimum $u(\tau_m)$ within this class is to do a perturbation around the constant $u_c$ discussed previously. One sets $u_2$ equal to the maximum non-uniformity that can be tolerated at the highest density and sets $u_1$ equal to $u_c - \epsilon$, $\epsilon >= 0$. One then varies $\epsilon$, starting with $\epsilon = 0$ until one reaches the maximum value for which Equations 7 and 8 are satisfied for the given M. FIG. 9 shows the kind of uniformity (constant uniformity case) one gets with this kind of approach.

Figure 12:
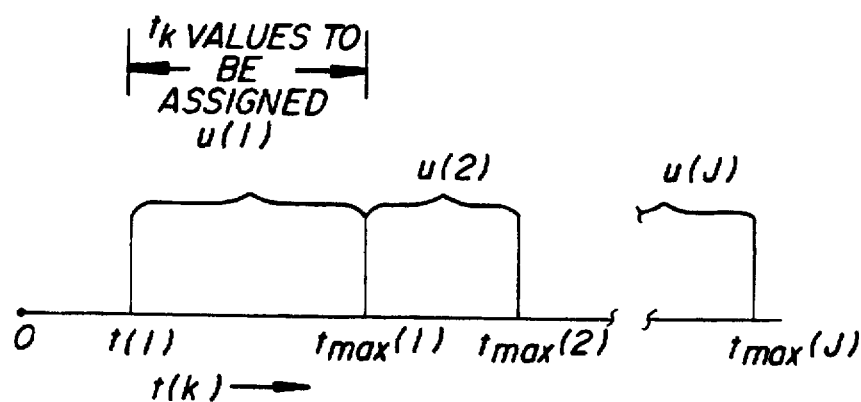
FIGS. 12 and 13 are additional illustrations supporting the explanation of my calibration method.
Figure 10B:
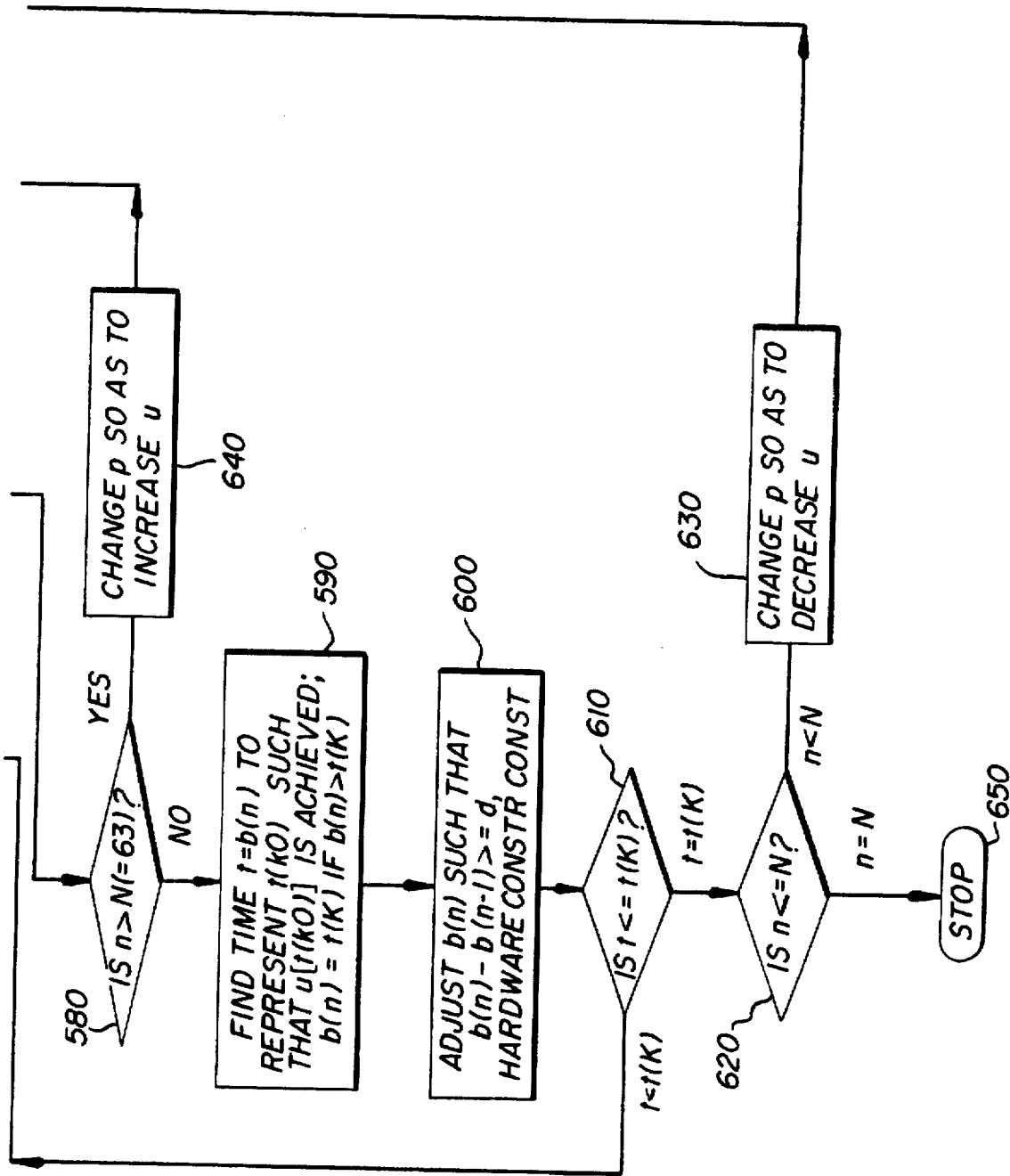
FIGS. 10 and 11 are flowcharts that are used in conjunction with the explanation of my calibration method.
Figure 11:
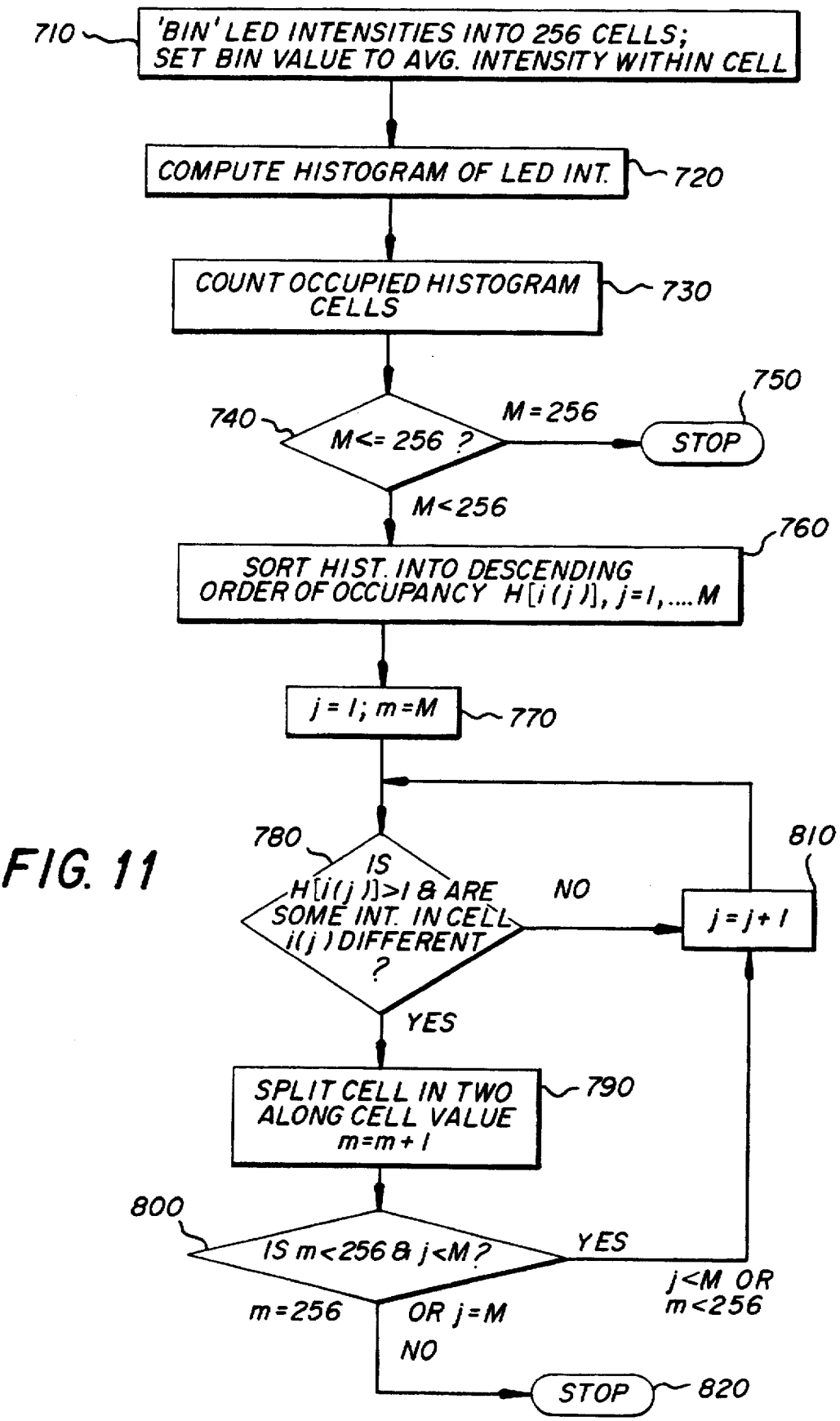

An algorithm for determining a set of $2^{k-1}$ corrected exposure times in accordance with the invention will now be provided with reference to the flowcharts of FIGS. 10, 11 and 12. In step 510, the intensity of the output of each LED is individually measured when assembled with their respective Selfoc lens. In accordance with their measured intensities, the LEDs are "quanitized" in accordance with the algorithm set forth in FIG. 11. The use of quantization is for practical implementation to reduce the number of calculations or due to hardware limitations. It is possible to eliminate this quantization and use original intensities in performing my calibration method. With reference to FIG. 11 in step 710, the measured LED intensity that is a minimum is subtracted from the maximum measured intensity value and this difference is divided by 256. This establishes a bin or cell width and 256 cells of this width are defined between the minimum and maximum intensity values. The LED intensity values are then assigned a cell into which their intensity falls. The cell value is then set to the average intensity within the cell. In step 720, a histogram is then created of the average intensity calculated for each cell and the number of LEDs in that cell. In step 730, a count is made of the number, M, of non-empty cells. In step 740, a decision is made as to whether or not this number is equal or less than 256. Note that while 256 cells were initially defined, it is possible that some cells did not have any LEDs that fell within the intensity range for those cells and thus in some cases less than 256 occupied cells may result. If all the 256 cells are occupied, then the quantization process is over, step 750. If less than 256 cells are occupied, the algorithm provides for creating additional cells by division of other cells. An example of one approach is illustrated in steps 760 through 820. When M<256, the histogram is sorted into descending order of occupancy H [i (j)], j=1, ... M. That is, the M cells in the histogram are ordered so that the first cell includes the most occupants and the last cell, the least number of occupants (i.e. assigned LEDs). Considering now the first cell j=1 (step 770), an investigation is made in step 780 as to whether or not the number of occupants for this cell is greater than one and whether or not some of the intensity values in this cell are different. If the answer is no, the next cell is investigated, step 810. If the answer is yes, the cell is split into two new cells with occupants of the cell having intensity values above the average for the cell assigned to one of these new cells, and those below the average for the cell assigned to the other cell, step 790. In decision step 800, a determination is made as to whether or not after this cell division there are now 256 cells and whether or not all the cells, M, have been considered for possible division. If there are now 256 cells or all the cells so considered, the quantization process is completed, step 820. If the new total number of cells is less than 256 and not all the cells, M, have been considered, the next cell in the descending ordered histogram is considered for division and this repeats until typically 256 cells are created.

Returning now to the flowchart of FIG. 10 in step 520, the exposure times t (i, j) for each bin or cell value i is calculated. This is done by first calculating for each of the 256 cells an average intensity value for the cell. Now for each gray level j, there is a desired set point exposure value. Thus, if there are 15 gray levels (excluding zero or no exposure) j=values 1 ... J where J=15 in this example. Since exposure equals intensity times time, the exposure times t (i, j) are calculated by dividing the set point exposure level for each gray level by the average intensity of each cell. Since there are in this example 256 cells and 15 gray levels, there will be 256×15=3840 exposure times t (i, j). There is also computed $t_{max}$ (j), which are the 15 exposure times for the LED having the weakest intensity. These values are calculated by dividing the intensity of this LED by the set point exposure level for each gray level.

In step 530, the set of exposure times {t (i, j)} are sorted into ascending order with duplicates being removed. Since they are in straight ascending order, these times are now defined as a set of a new variables t(k) with k=1, ... K. It is now desired for say a 6-bits exposure system, to determine 63 exposure times that the times t (k) may be assigned within the non-uniformity constraints of u (j, p).

Considering now step 540, the non-uniformity variable u (j; p) is broadly defined for each exposure level. For example, u (j ; p) at the first exposure or gray level might be set at only 2% because the eye is more critical at distinguishing small differences of exposure. At other gray levels, the non-uniformity measure u (j, p) might be larger. Thus, assuming a linear relationship for determining the variable u (j; p) the non-uniformities might have those at j=J, (J=15) be 5% greater than at j=1. The value 5% can then be divided by the number of gray levels 15 so that the non-uniformity varies by 0.33% with each increase in gray level where u (1) is 2%, u (2) is 2.33%, etc. up to u (15) equals 7%. Obviously, other relationships are possible and may even be non-linear with exposures tending to be skewed towards one end or the other.

With u (j; p) now defined, there is now associated in step 550 a time t(k) with each u(j, p). This is done by defining the previously calculated values $t_{max}$ (j); see step 520, as a boundary for assigning the time t(k) to, in this example, 15 different non-uniformity parameters u [t (k)]=u (j, p)=set of u (1), u (2), ... u (J=15); see FIG. 12.

Figure 13:
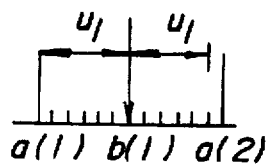

In step 560 and with reference to FIG. 13, a time value t=b(1) is chosen wherein $$u(1) = \frac{b(1) - a(1)}{a(1)}$$

In this example u(1) is defined as 2% and a (1) is t(1) which is the lowest exposure time in the set t(k).

With reference now to step 570, the boundary a(2) is similarly found from the relationship $$\frac{a(2) - b(1)}{a(2)} = u(1)$$

Note if a(2) falls or doesn't fall exactly on one of the times t(k), the boundary a(2) is shifted to the right to t(k+1). This is done to pack more times t(k) into the earlier exposure times which in this example are assigned to have smaller non-uniformity errors. Recall also from above that the theory explaining "u" was described with reference to FIG. 4. The values t(k) in a first cell between a(1), which is $t_{min}$ and a(2) all are at least about within the non-uniformity range u(1).

In decision step 580, a determination is made as to whether cell number n is greater than N, the number of cells that typically will be made. Since 63 nominal exposure times will be defined (for a 6-bits per pixel exposure system) N=63 cells are to be made. Since only the first cell has been defined, obviously the answer is no.

In step 590 a similar process is described as that for steps 560 through 580 for finding subsequent cell values b(n). A value b(n) need not be greater than the longest time $t_{max}$ (J) which is also defined as t(K).

In step 600, an analysis is made between each adjacent b(n) that they are greater than a minimum time, d or δ, for which this system is capable of generating exposure clock pulses. Thus, "d" is a hardware constraint constant below which the system is not capable of defining adjacent exposure times.

In decision block 610, a determination is made as to whether t=b(n) is less than t(K) or equal to t(K). If t<t(K), the process returns to step 570. If t=t(K), the process steps to step 620.

In step 620, a determination is made as to whether N=63 exposure times b(n) have been assigned. If n=N, the process stops. If n<N then what has been found is that the non-uniformity has been selected higher than necessary and the parameter p is changed so as to decrease u, step 630. Upon decreasing u, the process returns to step 540.

Thus, repeating the process steps 540–640, if it is determined at steps 580 (and 620) that more (or less) than N exposure times b(n) are required to meet the objectives of u (j; p) it is required that u (j; p) be changed so as to increase u (or decrease u) at least at certain points to force the process to define only N exposure times.

The process may be implemented in a computer controller by an appropriate program or programmed ASIC or other circuit.

Figure 14:
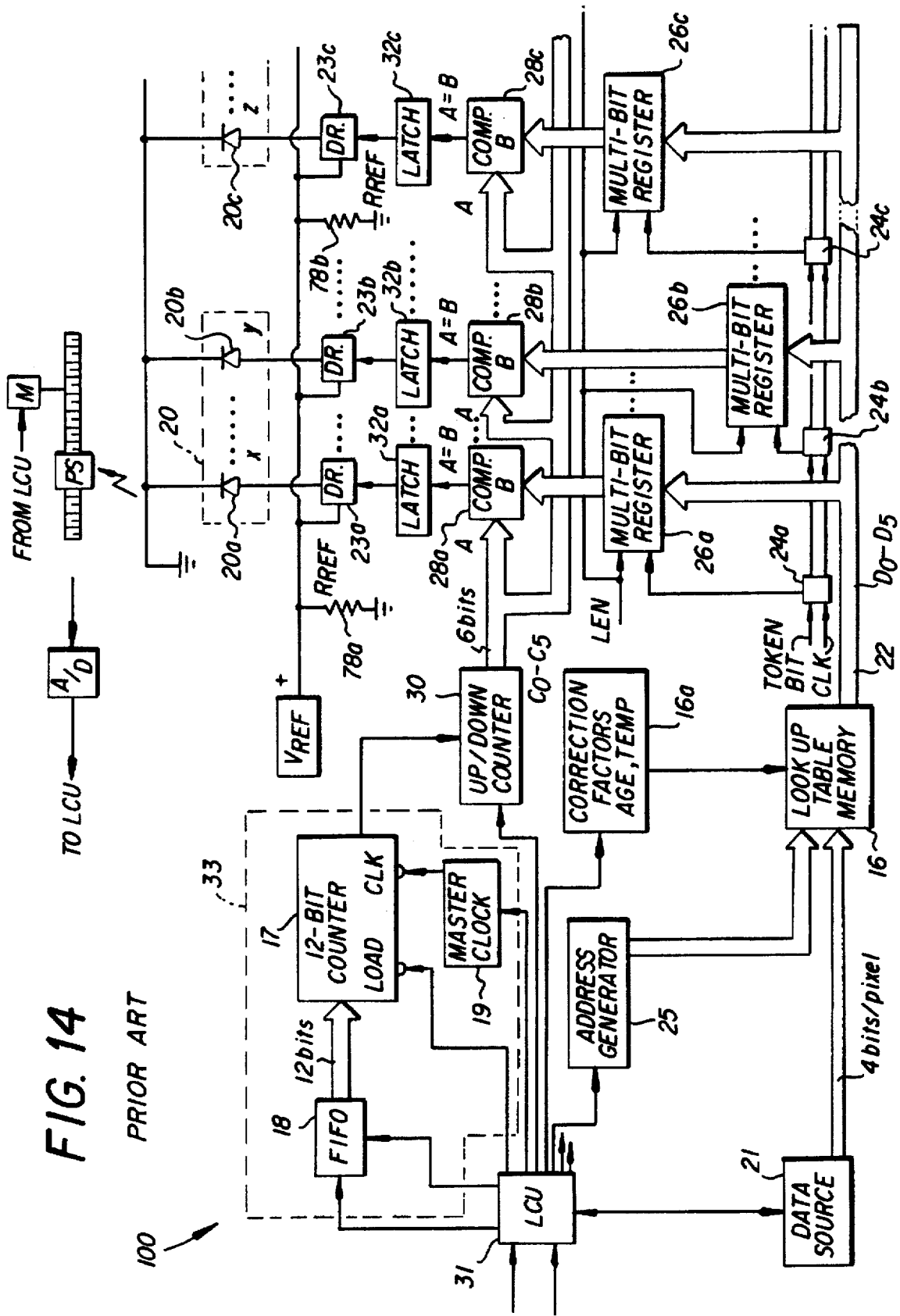
FIG. 14 is an illustration of a prior art printhead that may be modified with corrected exposure coefficients or times obtained in accordance with my calibration method.

With reference now to FIG. 14, a prior art LED printhead, such as that shown in U.S. Pat. No. 5,200,765, the pertinent contents of which are incorporated by reference, may be calibrated in accordance with the above described process to define values for a look-up table memory 16. As shown in FIG. 14, a linear array 10 of several thousand triggerable radiation sources, e.g. LEDs 20a, b, c in chip arrays 20 is disposed to expose selectively a photosensitive image-receiver medium that is movable relative to the array by suitable conventional means. Optical means for focusing the LEDs onto the medium may also be provided. In this regard, gradient index optical fiber devices such as Selfoc (trademark of Nippon Sheet Glass Co., Ltd.) arrays are highly suited. The LEDs of the array are triggered into operation by means of image processing electronics that are responsive to image signal information. Depending on the duration for which any given LED is turned on, the exposure effected by such LED is more or less made. Where the medium is, say, photographic film the latent image formed line by line by selective exposure of said LEDs may be subsequently developed by conventional means to form a visible image. Where the medium is an electrophotographic receptor, the LEDs may be used to form an electrostatic image on a uniformly electrostatically charged photoconductor and this image developed using colored toner particles and perhaps transferred to a copy sheet.

A circuit 100 is also shown for triggering selectively the LEDs 20 that together comprise the array 10. Only a few of the LEDs and its associated driver circuitry are shown for clarity purposes, it being understood that the circuitry for driving such other LEDs is similar to that described for the illustrated examples. While the figure shows all the driver circuitry associated with the LEDs located to one side of the line of LEDs, it is well known to place these circuits on both sides of the line of LEDs to provide more efficient utilization of space. In this regard, integrated circuit driver chips for driving odd-numbered LEDs are located on one side of the line of LEDs and identical driver chips for driving even-numbered LEDs are located on the opposite side.

Data to be printed for each line is in the form of binary digital signals, e.g., 1's and 0's. This data on lines labeled $D_0-D_5$ are outputted in parallel onto the data bus 22. The data on lines $D_0-D_5$ comprises, in this example, a six-bits signal representing an exposure time for a particular LED for printing a single gray level recorded dot. This six-bits per pixel signal represents a corrected exposure time for recording the pixel so that the pixels recorded achieve a uniformity within the parameters defined by u (j; p) above. The signals $D_0-D_5$ are output by a look-up table memory 16 which has at its input a 4-bits per pixel data signal from a data source 21 such a computer or scanner that defines a gray level for the pixel. The memory 16 may be a single memory or as shown in FIG. 6 may be split into an exposure coefficients table memory and an exposure time memory. Synchronously with the generation of each six-bit data signal, there is generated by, for example, a logic and control unit (LCU) 31 a token bit signal which is a single bit that is shifted down a shift register formed by a plurality of individual registers 24a, 24b, 24c, etc. Each such register is associated with a particular LED. This token bit determines which of the LEDs a particular set of data on bus 22 is intended. In operation, a series of six-bit data signals are provided on bus 22 and one six-bit signal is latched by each of the multibit registers 26a, 26b, 26c, respectively, associated with each LED. The latching being in response to the presence of the token bit in the particular respective token register 24a or 24b or 24c, etc. Further description relative to a circuit for selectively latching this data is provided in U.S. Pat. No. 4,746,941, entitled "Dot Printer With Token Bit Selection of Data Latching," the contents of which are incorporated herein by this reference. After a six-bit data signal is stored in each of the multi-bit registers, a latch enable (LEN) signal is provided by the LCU 31 to shift this six-bit signal to an output stage or latch of each register so that a six-bit level data signal (say decimal 10 for LED 20a for this particular PEL period) is output to one input terminal (B) of a respective digital comparator 28a, 28b, 28c, etc. associated with each LED. At this point in time a digital counter 30 is enabled by LCU 31 to count down, in this example, from decimal 63 ($2^6-1$) to 0. The output of the counter 30 is a six-bit signal, in this example, ($C_0-C_5$) representing in digital form a number or count which changes periodically in accordance with clock pulses from a programmable clock 33. With each pulse (or trailing edge of same) from clock 33, the counter changes its count at its output. The output of counter 30 is input into each of the input terminals (A) of the digital comparator. Thus, the comparators now compare the signals at their respective A and B inputs in accordance with the comparators criteria for operation, i.e., is A equal B? When the count output by the counter 30 and inputted at terminal A is equal to a respective input data signal count input at terminal B (decimal 10, for example, but can be any number between 1 and 63) the output of a respective comparator goes to a digital logic high level and is latched at a respective latch register 32a, 32b, 32c, etc. The latched signals allow drivers 23a, 23b, 23c to be enabled, at the rising edge of the next clock pulse from programmable or variable clock 33, to commence and maintain current respectively to LEDs 20a, 20b, or 20c, etc. After the counter 30 counts down to zero, the counter 30 is either reset by the next clock pulse into a count-up mode or is inhibited from counting additional clock pulses for a minimum period $T_{MIN}$ that is programmed into the counter or provided by other suitable means. After this predetermined time period $T_{MIN}$, the counter is set to count in its count-up mode and commences counting clock pulses again. When the counter output in its count-up mode reaches decimal 10, the output of comparator 28a changes and the latch 32a is reset and current to the LED 20a ceases. The other LEDs 20b, 20c, etc. operate in similar fashion but their data will require different count values to turn on and off in accordance with grey scale data provided in their respective multi-bit registers. What these LEDs will, thus, have in common with LED 20a is that all will have their respective current pulses centered. The current level to each LED driven by a particular driver chip is the same but the pulse duration for each LED during each line of print is varied. In this embodiment the LEDs may be initially "balanced" such as by adjusting a "trim" resistor 78a, 78b, associated with current mirrors for each driver chip, see for example U.S. Pat. No. 4,831, 395. Other known techniques for balancing output of the recording elements may also be provided. See, for example, U.S. Pat. No. 4,885,597 in the names of Pin Tschang et al. In addition, further balancing or correction for unequal light output is provided as discussed above by adjustment of the data in accordance with the characteristics of each LED. Memory device 16 such as a programmable read-only memory device or PROM may store the characteristics of each LED and data for that LED can be modified to provide an input count at terminal B that represents data modified by the exposure characteristics of the LED. Thus, for an LED that is a relatively strong light emitter the PROM modifies gray level data bits for that LED to reduce the count that otherwise would be provided at terminal B based solely on the data.

As noted from above, for this example, the allowed exposure times number 63 which is $2^6-1$. Thus, only 6 data lines are required to go to the printhead to provide possible exposure enabling times for the LEDs that extends over a relatively long duration yet provides for fine approximations for correction in those areas of lightness space where it is needed.

In U.S. Pat. No. 5,200,765, description is provided as to one method and apparatus for generating the exposure clock signals for creating these 63 exposure times which are nonlinearly related. Required exposure times may vary, for the particular printhead from say 6 microseconds to about 80 microseconds. Recall also that the technique employed for creating a single pulse width exposure period is to provide a minimum on time $T_{MIN}$ for the shortest duration pulse used which can be considered the pulse for driving the very brightest LED for the minimum time necessary to record gray level No. 1. Still other programmable clocks may be used.

In the discussion provided above, it was noted that the data source 21 provided data information having 4 bits per pixel while the data passed along to data bus $D_0$–$D_5$ was 6 bits per pixel. As may be noted in FIG. 14, the data sources output is input to the lookup table memory device 16 along with an address provided by an address generator 25. The address generator points to the location in memory device 16 thereof where data is stored for each particular LED. Thus, a table of memory is provided for each LED and indicates for this LED a corresponding exposure time for each grey level it is to prim. It is this exposure time which is a six-bit digital number that is output as data onto data bus $D_0$–$D_5$. Obviously, examples of 4 and 6-bits are exemplary and other bit depths may be used.

To automatically calculate the exposure times, the LEDs are mounted on a suitable support S as a row of aligned chip arrays 20. Integrated circuit driver chips receive appropriate signals for use in generating the exposure timing signals for controlling the on-time for each LED during exposure periods for recording lines of pixels. A Selfoc lens or gradient index lens focuses light from the LEDs onto a photosensor, PS, placed at the focal plane of the lens. A motor is coupled to a mirror and/or photosensor to step same from LED to LED. The output of the photosensor is an analog signal and is input to an analog to digital converter (A/D) for input to a logic and control unit 31 (LCU) over appropriate lines. The LCU controls the stepping of motor, M, photosensor PS, and/or mirror and includes a microcomputer programmed for calculating the 63 exposure times. The program for calculation of exposure times is in accordance with the flowcharts of FIGS. 10 and 11 and the description provided above.

The calibration process may take place in the factory where the printhead is manufactured and/or assembled in the machine. It may also take place from time to time where the printer is located during periods of job production inactivity. The use of an automatic calibrator as described herein on the printhead may obviate the need to correct data because of age and temperature considerations as indicated by device 16a. Such consideration may be corrected instead by adjusting current level to the LEDs.

Thus, as described above an improved calibration method is described featuring:

1) Dividing the composite exposure range for all the gray levels into 'cells' and assigning a single exposure time to each cell:
2) Defining a measure of non-uniformity (u) in terms of peak-to-peak deviation and establishing a mathematical relationship between this measure and the hardware constrained minimum resolution δ (in exposure times) for each cell.
(3) Using the above relationship to obtain the boundaries of each cell, the associated exposure time and the corresponding number of cells for a given non-uniformity measure.
(4) Using the above relationship in 2) and the procedure in 3) to obtain the non-uniformity measure $u_0$ for which there are exactly $2^k-1$ cells (k=bit depth of printhead controller); i.e., the exact number of exposures that the LED controller can generate. This represents the minimum u for this m since u is a monotonically decreasing function of the total number of exposures);

These steps can also be used to generate the cell boundaries and cell exposure times in the case the desired non-uniformity measure in a function of the gray levels or the cells, within the constraint of the hardware. In this case, it may be necessary to obtain the desired non-uniformities in the midtones and push the rest of the non-uniformity to higher density where the eye is less sensitive. These procedures are easy to implement and can be used for any set of gray levels and is robust in the sense that it adjusts automatically to produce the optimum $u_0$ or the optimum u as a function of the gray level, regardless of what the gray level set and/or the LED intensity distribution is.

There has thus been shown an improved and robust method of calculating exposure times and/or exposure coefficients for each level of gray.

Advantages

The advantages of the present invention are:

1. It provides an easy-to-implement-and-use method of correcting the inherent non-uniformity in an array of LEDs comprising an LED printhead over j>1 bits of gray rather than binary (j=1) as is the case for most of prior technology.
2. The method in the present invention is robust in that it can be used for any set of gray levels and any distribution of LED light intensities to produce the optimum uniformity either as a constant or as any preferred function of the gray levels.
3. The method does not require any user intervention for its operation.
4. The method can be used for purposes of recalibration that may be necessitated by the aging and/or thermal heating of the LED printhead or by the variation in the electrophotographic or other exposure process.

The invention has been described in detail with particular reference to preferred embodiments thereof, but it will be understood that variations and modifications can be effected within the spirit and scope of the invention.

APPENDIX 1

Lower Bound:

In this Appendix, we derive the upper and lower bounds shown in Eqns. (11) and (12)

In Eqn. (9), we showed that $$\tau_m >= (\delta/2u)(1-u)/(1+u)$$

Substituting $\tau$ for $\tau_m$ and multiplying out, we get $$2\tau u^2 + u(2\tau+\delta) - \delta >= 0$$

Solving this quadratic equation, the only meaningful solution (realizing that u>=0) is $$u >= (\sqrt{(4\tau^2 + \delta^2 + 12\delta\tau)} - (\delta + 2\tau))/4\tau$$

i.e. $u_{min} = (\sqrt{(4\tau^2 + \delta^2 + 12\delta\tau)} - (\delta + 2\tau))/4\tau,$ $$\Delta_m = \tau_{m+1} - \tau_m$$
$$= (2u/(1-u))\tau_m$$
$$= (2u/(1-u))((1+u)/(1-u))^{m-1}\tau_{min}$$

APPENDIX 2

Parmetrizing the Non-Uniformity Measure u

Due to the fact that the eye is more sensitive to density variations in the low density region than in the high density region, the non-uniformity measure u should be chosen to be a monotonically non-decreasing function u(T;p) of exposure time T, where p is a parameter such that u(.;.) is also a monotonic function (increasing or decreasing) of p.

The exposure levels Tj are usually chosen to represent equal lightness exposures. Thus, a good functional form for u(.;.) is linear and we can therefore write $$u(j)=u0+\delta.(j-1)/(J-1), \; j=1, \ldots J \text{ and } J=\# \text{ of exp level} \quad (1)$$

Figure 1:
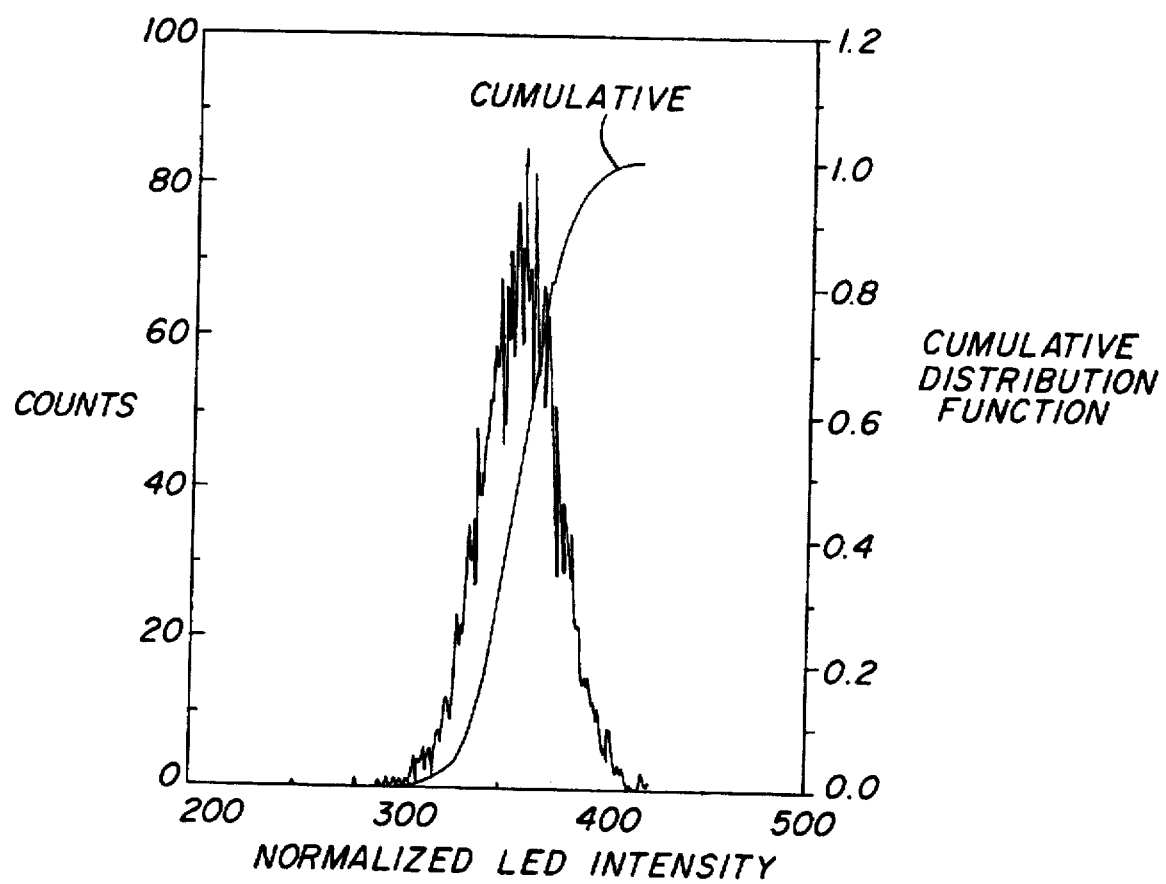
FIG. 1 is an illustration showing a typical distribution of LED intensities on a gray level printhead.
Figure 2:
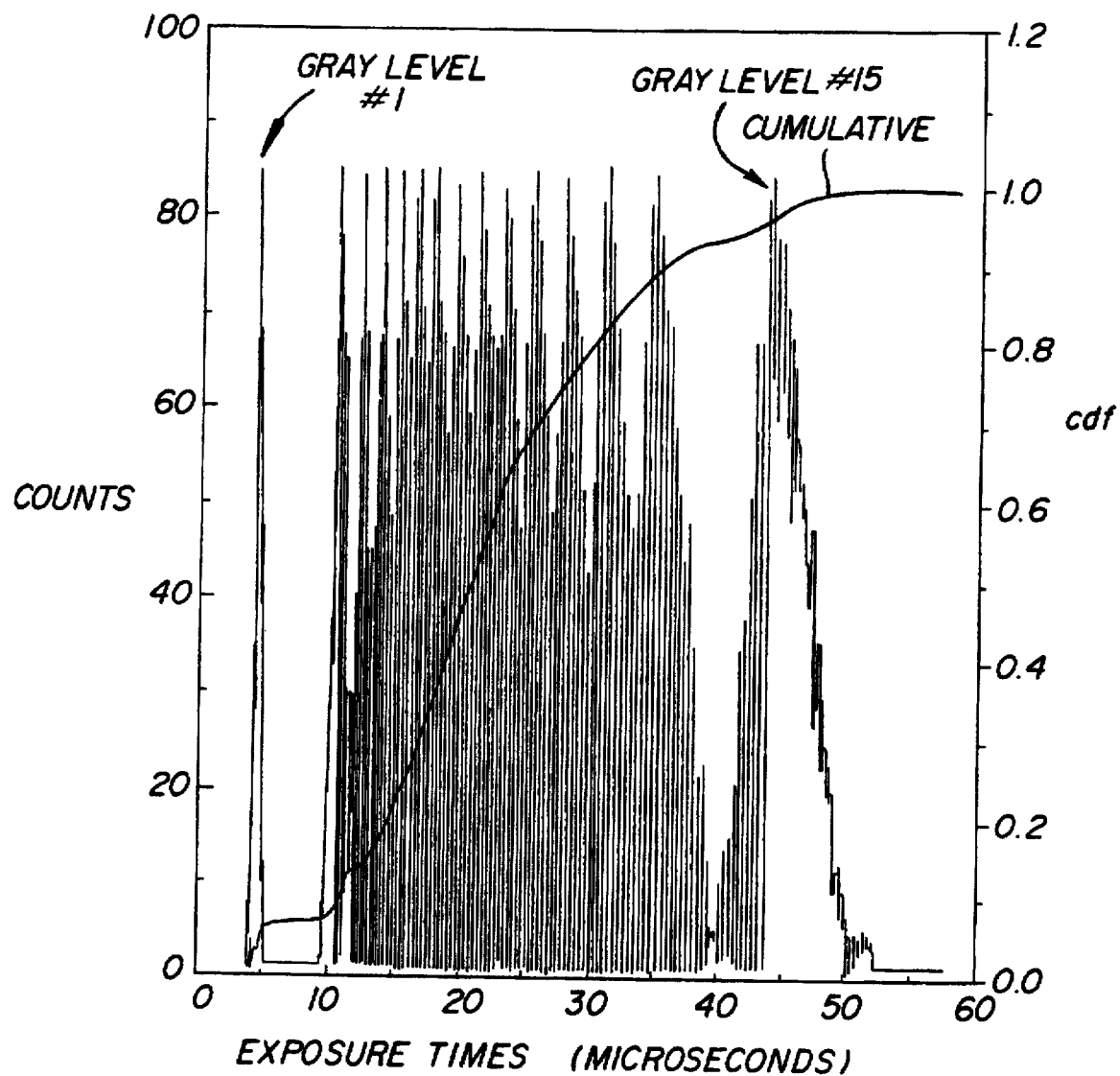
FIG. 2 is an illustration showing a distribution of exposure times on the printhead of FIG. 1.
Figure 3A:
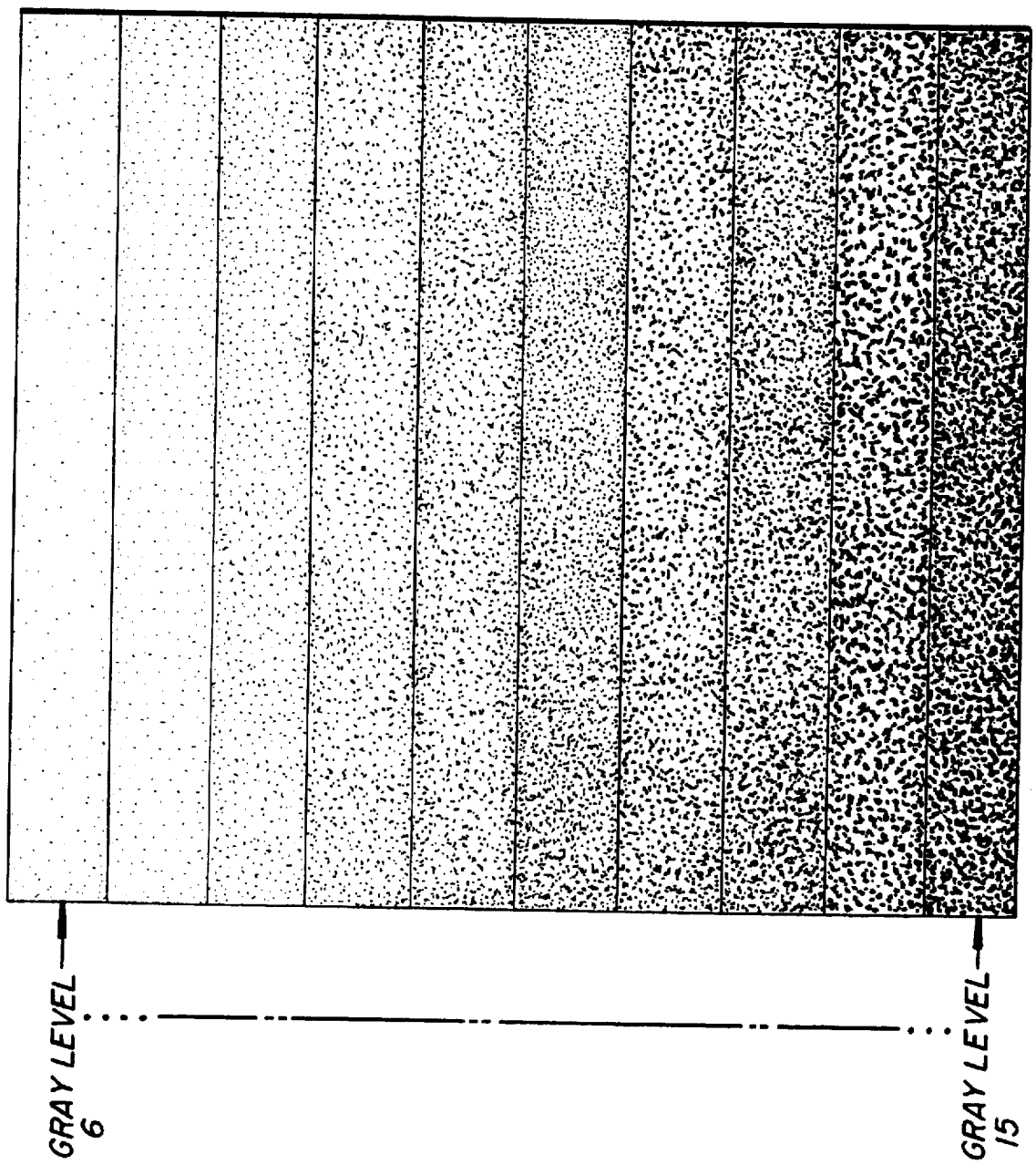
FIG. 3a shows printing using the printhead of FIG. 1 in steps from gray level 6 through gray level 15.
Figure 3B:
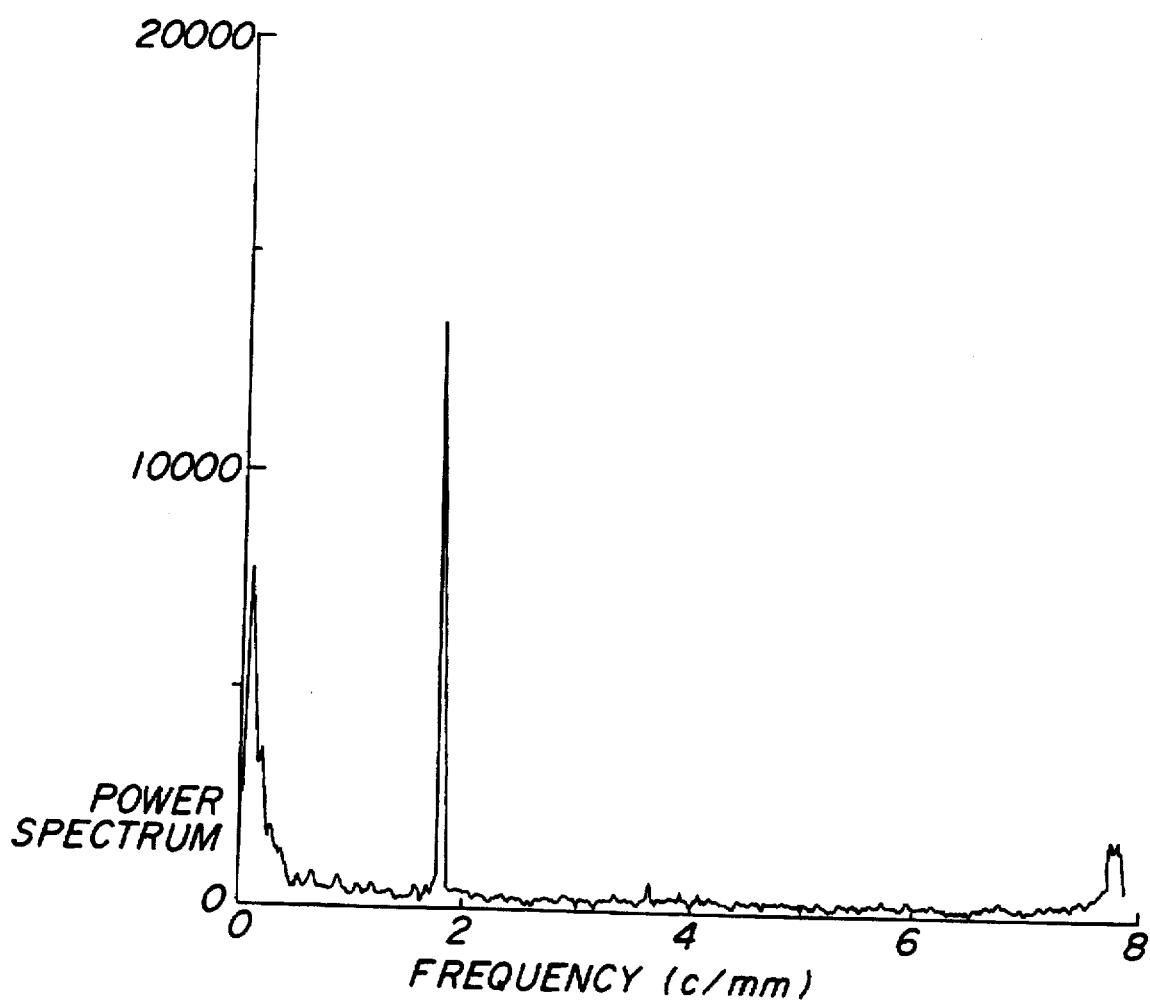
FIG. 3b shows a power spectrum for an uncorrected printhead of FIG. 1, the spectrum being obtained by reading across a gray level in FIG. 3a and transforming to frequency space.

This implies that u increases linearly from a minimum of u0 at the lowest exposure to a maximum of u0+δ at the highest exposure. In this case, u0 and δ are possible parameters of the function. One can hold δ constant and increase/decrease u0 to increase/decrease u(j) i.e. the parameter p in FIG. 2 is u0. Alternatively, δ can be made the parameter while u0 is held constant.

The linear relationship above can also be couched differently as $$u(j)=u0+u0.(\alpha-1).(j-1)/(J-1) \quad (2)$$

where α is defined as the ratio u(J)/u(1). In this form, α can be held constant while u0 is varied or vice versa.

The case u(j)=constant is, of course, included in all these reprensentations. It is obtained by setting δ=0 in (1) or α=1 in (2).

I claim:

1. A method for calibrating a gray level recording printhead having a plurality of recording elements, the method comprising the steps of:
   (a) measuring a parameter of each recording element the parameter relating to a recording characteristic of the element;
   (b); in response to measuring the parameter of each recording element, defining a set of cells of time periods having time boundaries that are substantially about a value u from a calculated exposure time b(n) for each cell;
   (c) repeating step (b) for at least some of said cells if a number of calculated exposure times b(n) is other than N, a number of available exposure times to the printhead; and
   (d) storing a set of values representing b(n) in a memory associated with the printhead when the number of calculated times b(n) is N.

2. A method for calibrating a gray level recording printhead having a plurality of recording elements, the method comprising the steps of:
   (a) measuring a parameter of each recording element; the parameter relating to a recording characteristic of the element;
   (c) in response to measuring the parameter of each recording element, defining a set of cells of time periods, with each cell having boundaries that are substantially within a value from a calculated exposure time for each cell;
   (c) determining if a number of calculated exposure times is other than a number of available exposure times to the printhead;
   (d) upon determining that a number of calculated exposure times is other than the number of available exposure times to the printhead, repeating step (b) for at least some of said cells; and
   (e) when the number of calculated exposure times is the number of available exposure times to the printhead, storing a set of values representing the calculated exposure times in a memory associated with the printhead.

3. The method of claim 2 and including the step of, in response to a signal calling for recording of a gray level pixel by a recording element, transforming the signal into a second signal for controlling a duration of a recording period for recording the pixel, the duration being related to one of the stored set of values representing exposure times.

4. A method for calibrating a grey level recording printhead having a plurality of light-emitting recording elements, the method comprising the steps of:
   (a) measuring a light output parameter of each recording element of said plurality of recording elements;
   (b) quantizing the light output parameters measured in step (a) into M first cells where M is a whole number greater than one;
   (c) computing for each first cell an exposure time t (i, j) wherein i is a number representing number of first cells and varies from i=1, . . . M and j is a number greater than one representing a number of gray levels;
   (d) sorting a set of exposure times t (i, j) to remove duplicate times to define a new set of exposure times t (k);
   (e) associating a constant value u with each exposure time t (k);
   (f) defining boundaries for plural second cells wherein a subset of the set of exposure times t(k) falls within each cell and are spaced within substantially about the value u from a time b (n) that is calculated from a cell boundary and also falls within the boundaries of each cell;
   (g) if a number of calculated times b (n) is such that n is different from N, a number representing a number of available exposure times of the printhead, certain of the steps between (b) and (f) are repeated with replaced values u until n=N; and
   (h) storing a set of values representing b (n) in a memory associated with the printhead.

5. The method of claim 4 and including the step of, in response to a signal calling for recording of a gray level pixel by a recording element, transforming the signal into a second signal for controlling a duration of a recording period for recording the pixel, the duration being related to one of the stored set of values representing exposure times b(n).

6. A method for calibrating a grey level recording printhead having a plurality of light-emitting recording elements, the method comprising the steps of:
   (a) measuring a light intensity of each recording element of said plurality of recording elements;
   (b) quantizing the light intensities measured in step (a) into M first cells where M is a whole number greater than one;
   (c) computing for each cell an exposure time t (i, j) wherein i is a number representing number of cells and varies from i=1, ... M and j is a number greater than one representing a number of gray levels;

(d) sorting a set of exposure times t (i, j) to remove duplicate times to define a new set of exposure times t (k);

(e) defining boundaries for plural second cells wherein exposure times, t (k), within a cell are spaced within substantially about the value u from a time b (n) that is calculated from a cell boundary and also falls within the boundaries of each cell;

(f) repeating, if a number of calculated times b (n) is such that n is different from N, a number representing a number of available exposure times of the printhead, certain of the steps between (b) and (f) with replaced values(s) u until n=N; and (g) storing a set of values representing b (n) in a memory associated with the printhead.

* * * * *